(12) United States Patent
Riihinen et al.

(10) Patent No.: US 6,731,739 B2
(45) Date of Patent: May 4, 2004

(54) BALANCING LOADS ON TELECOMMUNICATIONS LINKS

(75) Inventors: Wesa Riihinen, Luleå (SE); Johan Söderberg, Luleå (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 549 days.

(21) Appl. No.: 09/732,883

(22) Filed: Dec. 11, 2000

(65) Prior Publication Data

US 2002/0150229 A1 Oct. 17, 2002

(51) Int. Cl.[7] .............................................. H04M 7/00
(52) U.S. Cl. ........................... 379/221.01; 379/221.03
(58) Field of Search ........................ 379/221.01, 221.15

(56) References Cited

U.S. PATENT DOCUMENTS

| | | |
|---|---|---|
| 4,670,899 A | 6/1987 | Brody et al. |
| 4,905,233 A | 2/1990 | Cain et al. |
| 5,317,562 A | 5/1994 | Nardin et al. |
| 5,444,848 A * | 8/1995 | Johnson, Jr. et al. ... 395/200.15 |
| 5,590,126 A | 12/1996 | Mishra et al. |
| 5,654,958 A | 8/1997 | Natarajan |
| 5,930,249 A | 7/1999 | Stademann et al. |
| 5,956,339 A | 9/1999 | Harada et al. |
| 6,014,567 A | 1/2000 | Budka |

FOREIGN PATENT DOCUMENTS

| WO | 99/23842 | 5/1999 |
|---|---|---|

OTHER PUBLICATIONS

International Search Report mailed Feb. 7, 2003 in corresponding PCT Application No. PCT/SE01/02759.
International Preliminary Examination Report mailed Mar. 28, 2003 in corresponding PCT application No. PCT/SE01/02759.

* cited by examiner

*Primary Examiner*—William J. Deane, Jr.
(74) *Attorney, Agent, or Firm*—Nixon & Vanderhye, P.C.

(57) ABSTRACT

A telecommunications network (110) has a unit (100) and technique to alleviate congestion on a congested link as can occur, e.g., when a new connection seeks admission to the network. The congestion avoidance technique/unit ascertains, from a set of candidate connections ($C_0$, $C_1$, $C_2$, $C_3$), a best candidate to route in order to avoid the congestion. Further, the congestion avoidance technique/unit determines a best candidate path to which the best candidate connection is to be routed. The best candidate connection and the best candidate path are determined so that, after routing the best candidate connection to the best candidate path, a load of the weakest link in the network is as low as possible.

16 Claims, 7 Drawing Sheets

BALANCING LOADS ON TELECOMMUNICATIONS LINKS

This application is related to simultaneously-filed U.S. patent application Ser. No. 09/732,877 (attorney docket: 2380-202/BR40366), entitled "Control Node Handover In Radio Access Network", which is incorporated herein by reference in its entirety.

BACKGROUND

1. Field of the Invention

The present invention pertains to telecommunications, and particularly to the balancing of loads on links in a telecommunications network.

2. Related Art and Other Considerations

In a typical cellular radio system, mobile user equipment units (UEs) communicate via a radio access network (RAN) to one or more core networks. The user equipment units (UEs) can be mobile stations such as mobile telephones ("cellular" telephones) and laptops with mobile termination, and thus can be, for example, portable, pocket, hand-held, computer-included, or car-mounted mobile devices which communicate voice and/or data with radio access network.

The radio access network (RAN) covers a geographical area which is divided into cell areas, with each cell area being served by a base station. A cell is a geographical area where radio coverage is provided by the radio base station equipment at a base station site. Each cell is identified by a unique identity, which is broadcast in the cell. The base stations communicate over the air interface (e.g., radio frequencies) with the user equipment units (UE) within range of the base stations. In the radio access network, several base stations are typically connected (e.g., by landlines or microwave) to a radio network controller (RNC). The radio network controller, also sometimes termed a base station controller (BSC), supervises and coordinates various activities of the plural base stations connected thereto. The radio network controllers are typically connected to one or more core networks.

One example of a radio access network is the Universal Mobile Telecommunications (UMTS) Terrestrial Radio Access Network (UTRAN). The UTRAN is a third generation system which in some respects builds upon the radio access technology known as Global System for Mobile communications (GSM) developed in Europe. UTRAN is essentially a wideband code division multiple access (W-CDMA) system.

As those skilled in the art appreciate, in W-CDMA technology a common frequency band allows simultaneous communication between a user equipment unit (UE) and plural base stations. Signals occupying the common frequency band are discriminated at the receiving station through spread spectrum CDMA waveform properties based on the use of a high speed, pseudo-noise (PN) code. These high speed PN codes are used to modulate signals transmitted from the base stations and the user equipment units (UEs). Transmitter stations using different PN codes (or a PN code offset in time) produce signals that can be separately demodulated at a receiving station. In a phenomena know as diversity, the high speed PN modulation also allows the receiving station to advantageously generate a received signal from a single transmitting station by combining several distinct propagation paths or "legs" of the transmitted signal. In CDMA, therefore, a user equipment unit (UE) need not switch frequency when handoff of a connection is made from one cell to another. As a result, a destination cell can support a connection to a user equipment unit (UE) at the same time the origination cell continues to service the connection. Since the user equipment unit (UE) is always communicating through at least one cell during handover, there is no disruption to the call. Hence, the term "soft handover." In contrast to hard handover, soft handover is a "make-before-break" switching operation.

There are several interfaces of interest in the UTRAN. The interface between the radio network controllers (RNCs) and the core network(s) is termed the "Iu" interface. The interface between a radio network controller (RNC) and its base stations (BSs) is termed the "Iub" interface. The interface between the user equipment unit (UE) and the base stations is known as the "air interface" or the "radio interface" or "Uu interface". An interface between radio network controllers (e.g., between a Serving RNC [SRNC] and a Drift RNC [DRNC]) is termed the "Iur" interface.

Thus, a network such as a W-CDMA system has numerous nodes which are interconnected, for example numerous radio network controller (RNC) nodes which are connected by inter-RNC links. Typically, one radio network controller node (RNC), denominated as the serving RNC or SRNC, is assigned to control a connection. The connection is between a first party, which is a mobile party (e.g., mobile station or user equipment unit), and another party (which may either be a mobile party or a fixed party [e.g., in the PLMN]). The connection can have plural legs involving different base stations in view of the diversity capabilities mentioned above. Moreover, the connection (with its possibly plural legs) may be routed to its SRNC over one or more inter-RNC links and through several radio network controller nodes, some of which may function as drift RNCs (DRNCs).

When a new connection is requested in a network, the system typically tries to set up the connection through the shortest path, thus making the closest network node an anchor (e.g., SRNC) for the connection. However, if the shortest path results in a congested path due to the new connection, the connection request will usually be rejected.

Thus, heavily utilized networks can become overloaded when attempting to admit a new connection. One or more of the links necessary for the new connection may become congested if the new connection is actually admitted. Undesirably, the network may be forced to reject the new connection. It would be preferably to make room in the network to accommodate admission rather than refusal of the new connection. But unless the load in the network is optimally balanced upon approaching an overload situation, it is essentially impossible to reconfigure the connections to afford accommodation of the new connection. And realistically, it is unlikely for a network to be optimally balanced in any event.

What is needed therefore, and an object of the present invention, is a technique for resolving potential network overload situations to facilitate admission of new connections.

BRIEF SUMMARY OF THE INVENTION

A telecommunications network has a unit and technique to alleviate congestion on a congested link as can occur, e.g., when a new connection seeks admission to the network. The congestion avoidance technique/unit ascertains, from a set of candidate connections, a best candidate to route in order to avoid the congestion. Further, the congestion avoidance technique/unit determines a best candidate path to which the best candidate connection is to be routed. The best candidate connection and the best candidate path are determined so that, after routing the best candidate connection to the best candidate path, a load of the weakest link in the network is as low as possible.

The telecommunications network has plural nodes including a common node. The telecommunications network carries a plurality of connections, each of the plurality of connections being carried over one of plural paths of the network. Each path of the network includes at least one link (each link connecting two of the plural nodes). Each of the plural paths is connected to the common node by one of the plural links. The plural nodes include radio network controller (RNC) nodes of a radio access network (RAN). In differing embodiments, the common node is a core network node or a control node of the radio access network. The congestion avoidance unit which performs the congestion avoidance unit technique can be situated at the common node or one of the other nodes.

The congestion avoidance technique of the invention develops, for each candidate connection, a network topology candidate connection subtraction load scenario (e.g., graph). The candidate connection subtraction load scenario for a candidate connection has a load for the corresponding candidate connection subtracted therefrom. For each candidate connection subtraction load scenario the congestion avoidance technique next determines a weakest link, so that for each candidate connection there is a weakest link of its connection subtraction load scenario.

The congestion avoidance technique further performs the following steps:

(a) for a particular candidate connection, developing a set of network topology path load scenarios, each path load scenario being developed by augmenting the connection subtraction load scenario for the particular candidate connection with a unique path assignment for the particular candidate connection;

(b) determining, for each network topology path load scenario of the set, a weakest link comprising the unique path assignment;

(c) determining, from the entire set of network topology path load scenarios, a strongest one of weakest links determined in step (b) for the particular candidate connection;

(d) determining a weakest link for the for the network topology path load scenario having the strongest one of the weakest links as determined in step (c); and (e) for the particular candidate connection, using the weakest link determined at step (d) as the weakest link of its connection subtraction load scenario if the strength of the weakest link determined at step (d) exceeds the strength of the weakest link of its connection subtraction load scenario as previously determined.

The candidate connection having a strongest weakest link of its connection subtraction load scenario is chosen as the best candidate connection. For the best candidate connection the unique path assignment determined as having the strongest one of the weakest links is used as the best candidate path.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Figure 1:
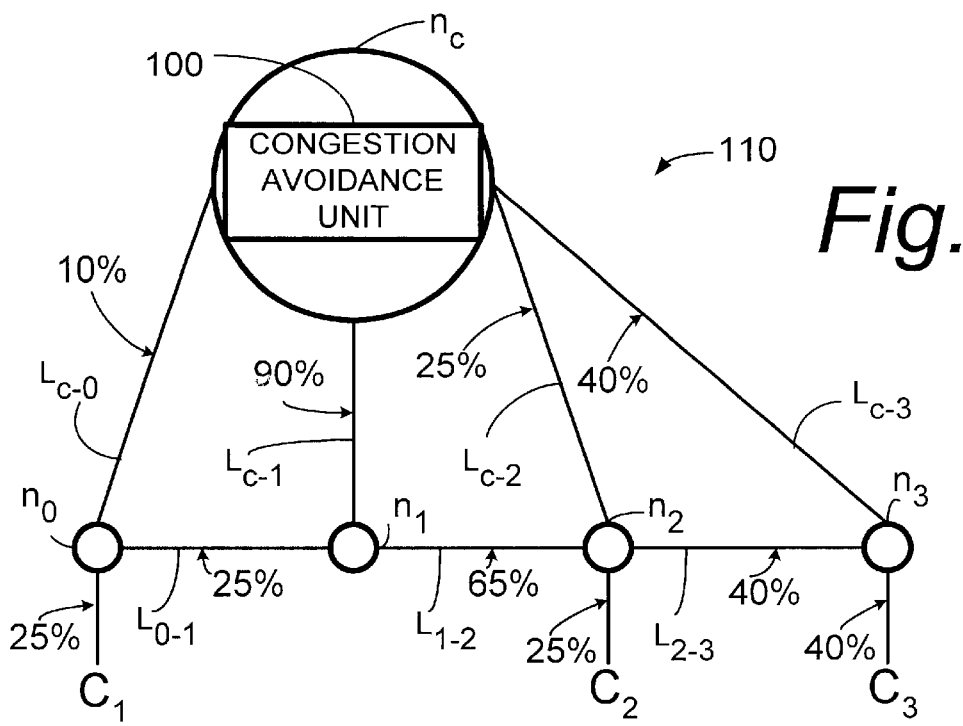
FIG. 1 is a schematic view of an illustrative example telecommunications network which employs a congestion avoidance technique of the present invention.

FIG. 1 shows a generic, representative telecommunications network 110 which illustrates certain aspects of the present invention. As described below, the telecommunications network 110 carries a plurality of telecommunication connections, three such connections represented as $C_1$, $C_2$, $C_3$ being shown in FIG. 1. The telecommunications network 110 comprises plural nodes n, of which nodes $n_0$ through $n_3$ and node $n_c$ are depicted in FIG. 1. The plural nodes n are connected by inter-node links L. For example, link $L_{c-0}$ connects node $n_c$ and node $n_0$; link $L_{0-1}$ connects node $n_0$ and node $n_1$; link $L_{c-1}$ connects node $n_c$ and node $n_1$; etc.

Each connection C is connected over a path of telecommunications network 110 to the common node $n_c$. A path comprises one or more of the inter-node links L. Each path has as one of its endpoints the common node $n_c$.

In one example implementation, the nodes $n_0$ through $n_3$ are control nodes of a radio access network, such as the UTRAN radio access network. In this implementation, the common node $c_n$ is a node of a core network, such as a mobile switching center (MSC) node, an SGSN node, or a general packet radio service node (GPRS) node. In the UTRAN example context, the links $L_{0-1}$, $L_{1-2}$, and $L_{2-3}$ are links across the Iur interface.

In another example implementation, all the nodes $n_0$ through $n_3$ and $n_c$ are control nodes of a radio access network, such as radio network controller (RNC) nodes of the UTRAN radio access network. In this implementation, all inter-node links L are across the Iur interface.

The ensuing description of a congestion avoidance technique of the present applies to both of the foregoing example implementations, e.g., whether the common node $c_n$ is part of the core network or part of the radio access network. The congestion avoidance technique of the present invention involves utilization of a congestion avoidance unit 100 which performs certain operations as herein described. In the illustrations herein provided, the congestion avoidance unit 100 is shown as being located at the common node $c_n$.

In essence, the congestion avoidance unit 100 alleviates congestion on a congested one of the links L by performing certain basic operations described hereinafter in more detail in connection with FIG. 6. Basically, the operations performed by congestion avoidance unit 100 include: (1) determining, for routing purposes, a best candidate connection (from the plurality of connections) to route for alleviating the congestion; and (2) determining a best candidate path on which to route the best candidate connection. The congestion avoidance unit 100 determines the best candidate connection and the best candidate path in such a manner that, after routing the best candidate connection to the best candidate path, a load of the weakest link in the network is as low as possible.

While showing the topology of telecommunications network 110, FIG. 1 also serves as a directed graph showing the connection configuration for connections $C_1$, $C_2$ and $C_3$, and with the weight of the vertices represented by percent link load. For example, at the time shown in FIG. 1, utilization of link $L_{c-0}$ is 10%; utilization of link $L_{c-1}$ is 90%; utilization of link $L_{0-1}$ is 25%; and so forth.

As employed herein, a "congested path" is a data path between two or more network nodes where the capacity of any link or node comprising the path is exceeded. The strength of a link is considered to be the quotient of the load and the capacity of a link. Thus, a weak link has a relatively higher load than a strong length. For example, link $L_{c-1}$ in FIG. 1 with its 90% utilization is weaker than link $L_{c-0}$ with its 10% utilization. Stated conversely, link $L_{c-0}$ is stronger than link $L_{c-1}$ at the point in time shown in FIG. 1.

Figure 2:
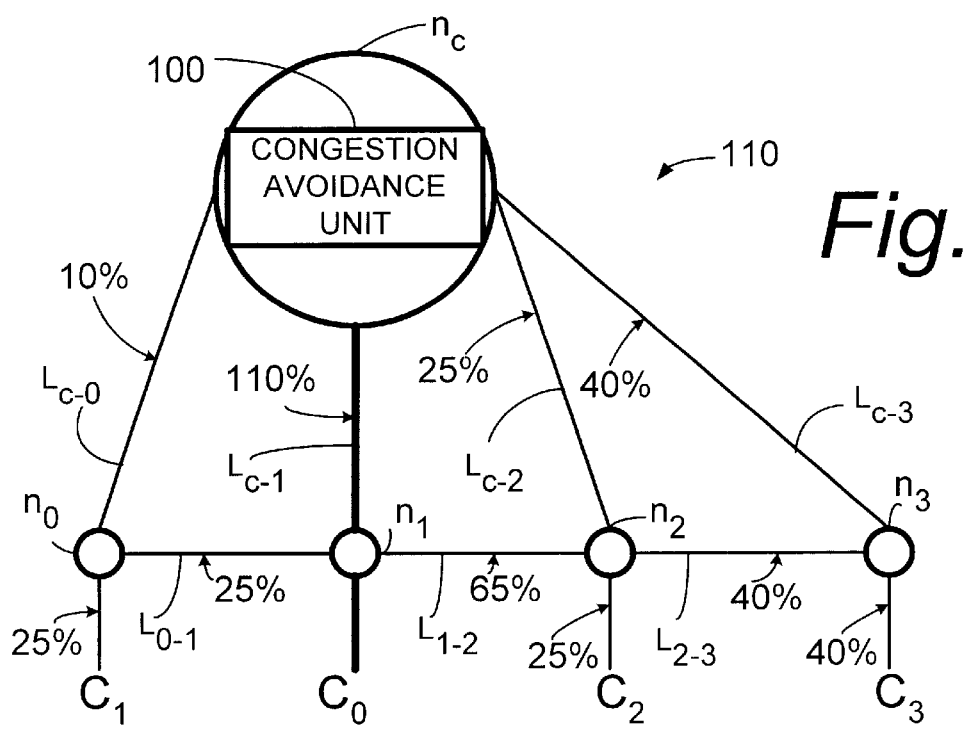
FIG. 2 is a schematic view showing a new connection seeking admission to the telecommunications network of FIG. 1 in a situation in which admission would cause congestion on a link of the network.

Consider the situation in FIG. 2, which differs from that of FIG. 1 by the attempt to add a new connection $C_0$ to telecommunications network 110. FIG. 2 particularly shows that attempted admission of new connection $C_0$ would result in a congested link. Specifically, the usage of link $L_{c-1}$ exceeds 100% (in fact, would be 110% as shown in FIG. 2). If the new connection $C_0$ is, in fact, to be admitted, something has to be done other than to route the new connection $C_0$ over a path including link $L_{c-1}$.

Upon detection of a congested path, the congestion avoidance unit 100 of the present invention finds a new data path for one or more connections using the congested path. The congestion avoidance unit 100 of the present invention judiciously chooses a proper best candidate connection to relocate from the congested path by determining a strongest weakest link. In other words, the congestion avoidance unit 100 routes the connection which—after relocation (e.g., routing)—produces an overall network configuration where the load of the weakest link in the system is as low as possible. The weakest link may be any link in the topology of telecommunications network 110 after relocation.

Figure 6:
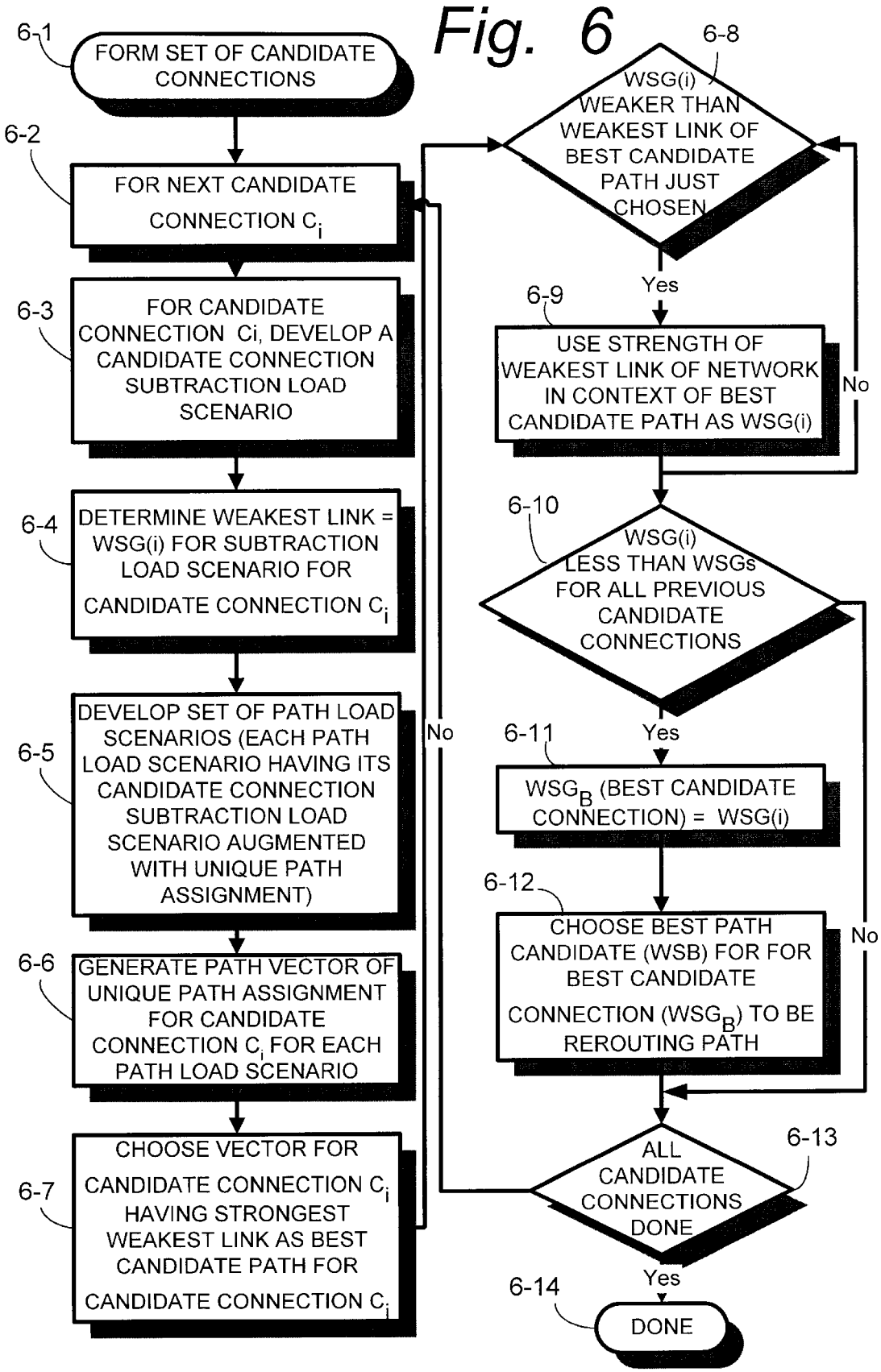
FIG. 6 is a flowchart showing basic example steps involved in a congestion avoidance technique according to the present invention.

FIG. 6 shows basic general steps performed by congestion avoidance unit 100. As step 6-1, congestion avoidance unit 100 forms a set of candidate connections for relocation/routing. The set of candidate connections formed at step 6-1 are those connections which use the congested path. For example, in a UMTS system the set of candidate connections can be those having their serving radio network controller node (SRNC) on the congested path. Thus, in the particular situation illustrated in FIG. 2 in which admission is sought for connection $C_0$, the set of candidate connections include connections $C_0$, $C_1$, $C_2$, and $C_3$.

Each candidate connection $C_i$ included in the set formed at step 6-1 is evaluated. The evaluation includes performance of a loop comprising steps 6-2 through 6-13 of FIG. 6. For example, in the context of the FIG. 2 situation, first the steps of the loop of FIG. 6 are performed for candidate connection $C_0$. Then the steps of the loop of FIG. 6 are performed for candidate connection $C_1$, followed by candidate connection $C_2$ and $C_3$, respectively. The loop of FIG. 6 includes certain steps (such as step 6-3, step 6-4, and step 6-8 through step 6-11) geared to determining which of the candidate connections $C_i$ (i=0,1,2,3) is the best candidate connection $WSG_B$. As explained subsequently, the abbreviation WSG stands for "weakest link of the subtracted graph". Other steps of the loop of FIG. 6 (such as step 6-5 through step 6-7 and step 6-12) are geared toward determining the best path candidate for the connection to be routed, i.e., for the best candidate connection $WSG_B$. Hereinafter, the loop of FIG. 6 is primarily discussed with reference to candidate connection $C_0$, with execution of the loop of FIG. 6 for other candidate connections being understood by analogy to the illustrative execution for candidate connection $C_0$.

In evaluating each candidate connection $C_i$, at step 6-3 the congestion avoidance unit 100 develops a candidate connection subtraction load scenario. The candidate subtraction connection load scenario is formed by subtracting the candidate connection $C_i$ from the congested path. In other words, for the situation of FIG. 2, the candidate connection $C_i$ is subtracted from a path which includes link $L_{c-1}$.

Figure 3A:
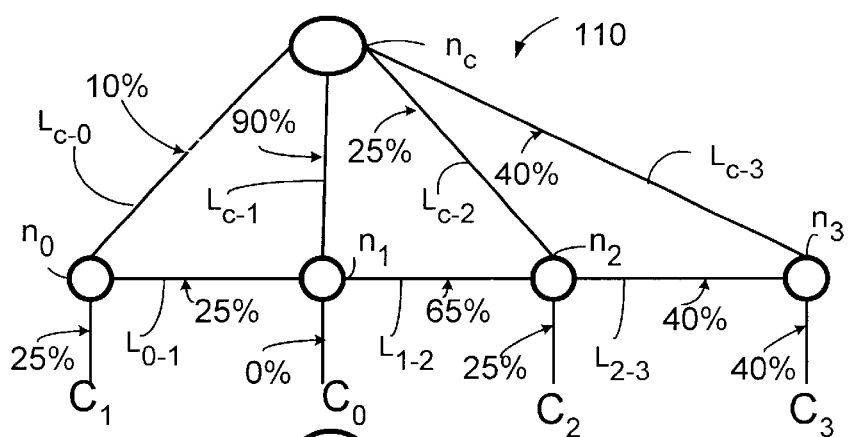
FIG. 3A–FIG. 3D are schematic views reflecting differing connection subtraction load scenarios for the connection admission situation of FIG. 2.
Figure 3B:
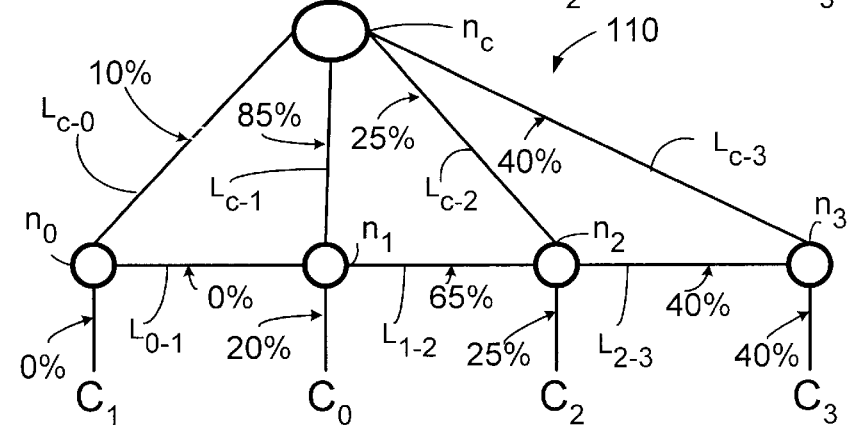
Figure 3C:
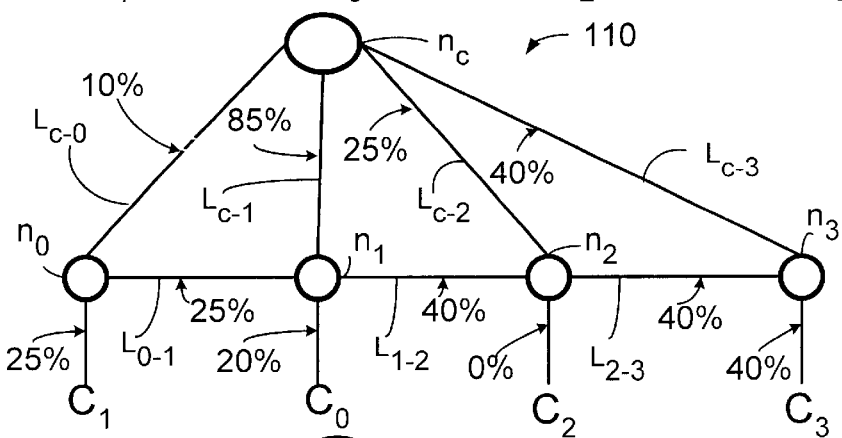
Figure 3D:
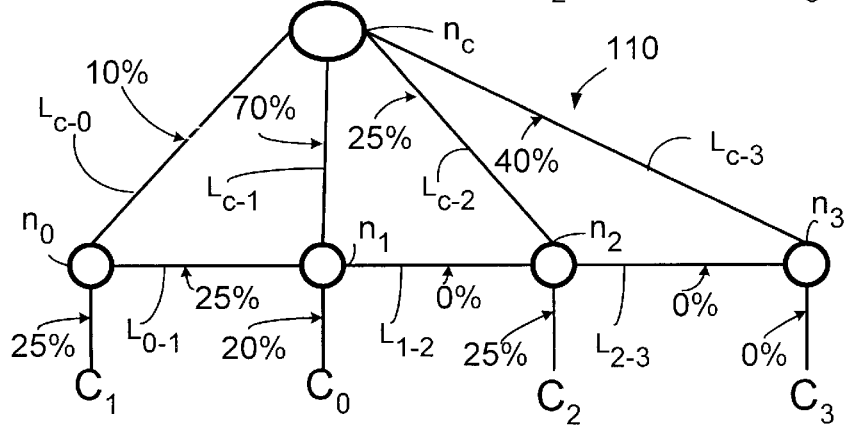

The development of various scenarios described herein, including the candidate connection subtraction load scenario, is illustrated with reference to a directed graph. In fact, as used herein, development of a scenario encompasses development of such a directed graph. The candidate connection subtraction load scenario developed for candidate connection $C_0$ of the situation of FIG. 2 is shown in the graph/schematic of FIG. 3A. As an aside, FIG. 3B–FIG. 3D show the candidate connection subtraction load scenarios for the situation of FIG. 2 for candidate connections $C_1$–$C_3$, respectively. FIG. 3B shows that, for the candidate connection subtraction load scenario developed for candidate connection $C_0$, the link $L_{c-1}$ has a 90% utilization.

As step 6-4, congestion avoidance unit 100 determines the weakest link of the connection subtraction load scenario developed at step 6-3 for candidate connection $C_i$. For candidate connection $C_0$, the weakest link of the graph of FIG. 3A is the link $L_{c-1}$, which has the aforementioned utilization of 90%. As part of step 6-4, the congestion avoidance unit 100 assigns the utilization percentage of the weakest link of the connection subtraction load scenario for candidate connection $C_i$ as Weakest link of the subtracted graph [WSG(i)]. For example, for candidate connection $C_0$ the value of WSG(0) is 90%. Ultimately the congestion avoidance unit 100 employs this weakest link of the connection subtraction load scenario, i.e., WSG(i), to determine which candidate connection $C_i$ is the best candidate connection. Basically, the candidate connection $C_i$ having a lowest value for its WSG(i) is chosen as the best candidate connection $WSG_B$ (see step 6-11).

At step 6-5 the congestion avoidance unit 100 develops a set of network topology path load scenarios (also called "path load scenarios") for the paraticular candidate connection $C_i$ involved in the execution of the loop of FIG. 6. Each path load scenario is developed by augmenting the connection subtraction load scenario (developed at step 6-3) for the particular candidate connection with a unique path assignment for the particular candidate connection $C_i$.

FIG. 4A–FIG. 4D show path load scenarios developed by congestion avoidance unit 100 at step 6-5 for candidate connection $C_0$ for the connection admission situation of FIG. 2. In the path load scenario of FIG. 4A, the unique path assignment for candidate connection $C_0$ comprises link $L_{c-1}$. For the path load scenario of FIG. 4B, the unique path assignment for candidate connection $C_0$ comprises link $L_{c-0}$ and link $L_{0-1}$. For the path load scenario of FIG. 4C, the unique path assignment for candidate connection $C_0$ comprises link $L_{c-2}$ and link $L_{1-2}$. For the path load scenario of FIG. 4D, the unique path assignment for candidate connection $C_0$ comprises link $L_{c-3}$, link $L_{2-3}$, and link $L_{1-2}$.

At step 6—6 the congestion avoidance unit 100 generates a path vector for the unique path assignment in the context of the path load scenario for candidate connection $C_i$. Table 1 below shows the path vector for the respective path load scenarios for candidate connection $C_0$ in the call admission situation of FIG. 2 being discussed.

TABLE 1

Figure 4A:
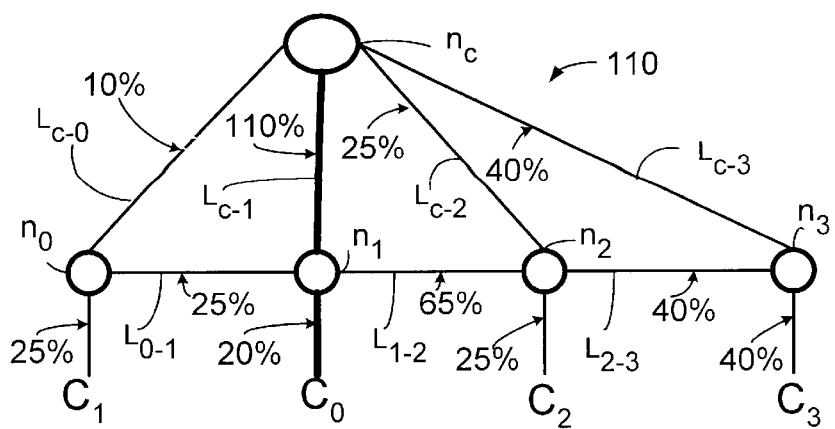
FIG. 4A–FIG. 4D are schematic views of path load scenarios developed by for a particular candidate connection for the connection admission situation of FIG. 2.
Figure 4B:
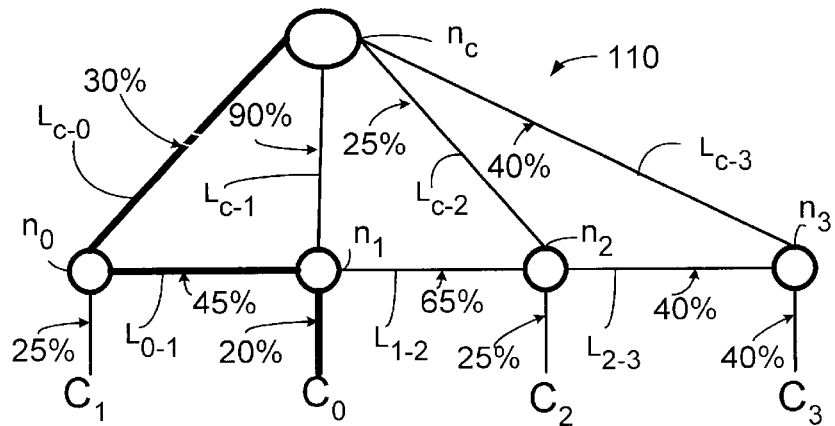
Figure 4C:
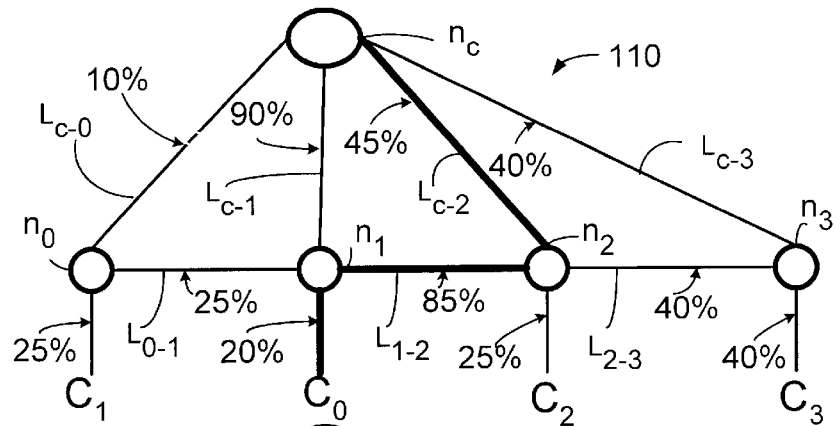
Figure 4D:
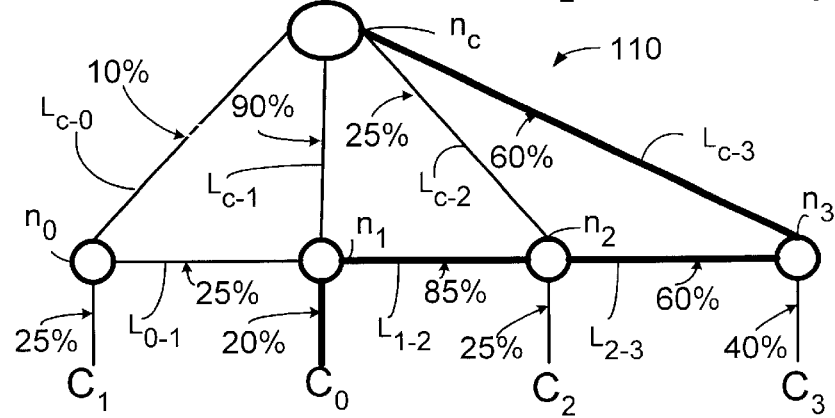

| Path Assignment (Links) | Path Vector | Weakest Link of Path | Weakest Link of Graph |
|---|---|---|---|
| $L_{c-1}$ [FIG. 4A] | {110%} | 110% | 110% |
| $L_{c-0}$; $L_{0-1}$ [FIG. 4B] | {30% 45%} | 45% | 90% |
| $L_{c-2}$; $L_{1-2}$ [FIG. 4C] | {45% 85%} | 85% | 90% |
| $L_{c-3}$; $L_{2-3}$; $L_{1-2}$ [FIG. 4D] | {60% 60% 85%} | 85% | 90% |

Table 1 lists, in its first column, each possible path assignment in the path load scenarios for candidate connection $C_0$. In particular, the first column of Table 1 lists the links involved in the respective path load scenarios. The second column of Table 1 shows the path vector for each possible path assignment, the elements of the vectors being the utilization percentage for the respective links of the path. The third column of Table 1 specifies the weakest link of the path assignment for the respective path load scenario. Lastly, the fourth column of Table 1 specifies the weakest link of the entire network (e.g., the entire directed graph) for the respective path load scenario.

Step 6-7 involves congestion avoidance unit 100 choosing the path whose vector has the strongest weakest link. From the third column of Table 1 it is apparent that the path load scenario having the unique path assignment comprising links $L_{c-0}$ and $L_{0-1}$ have the strongest weakest link. That is, the minimum of (110, 45, 85, and 85) is 45. Thus, the weakest link of links $L_{c-0}$ and $L_{0-1}$ is link $L_{0-1}$ (having 45% utilization). The weakness of link $L_{0-1}$ (45% utilization) is stronger (lower) than all the other utilization percentages listed in the third column of Table 1, and thus at step 6-7 the path comprising links $L_{c-0}$ and $L_{0-1}$ is chosen as the best candidate path for candidate connection $C_0$. The choice of the path comprising links $L_{c-0}$ and $L_{0-1}$ as the best candidate path for candidate connection $C_0$ is depicted in Table 1 by the row for that path appearing in boldface print.

Step 6-8 checks whether the WSG(i) value for the candidate connection $C_i$ is weaker than the weakest link of the best candidate path for the candidate connection $C_i$ as just chosen at step 6-7. That is, at step 6-8 the congestion avoidance unit 100 determines whether the weakest link of the connection subtraction load scenario, i.e., WSG(i), for candidate connection $C_i$ is weaker than the weakest link value in the vector for the candidate best path for candidate connection $C_i$. In the connection admission situation of FIG. 2 under discussion, for candidate connection $C_0$ it turns out that the previously computed value of WSG(0)=90% (see step 6-4) is weaker than link $L_{0-1}$ (which has a utilization of 45%). In view of the affirmative decision reached at step 6-8, step 6-9 is next performed before performing step 6-10. At step 6-9, the strength value of the weakest link of the entire network in the path load scenario having the vector chosen at step 6-7 is used to replace the previously calculated (at step 6-4) value for WSG. For the path load scenario that yielded the best path candidate (e.g., the path load scenario of FIG. 4B), the weakest link of the entire network (stored in the fourth column of Table 1) is 90% (for link $L_{c-1}$). Thus, for candidate connection $C_0$, WSG(0) value becomes 90%. As it turns out, therefore, the replacement at step 6-9 results in the same value being stored as WSG(0), but such may not necessarily be the case in other situations.

At step 6-10 the congestion avoidance unit 100 compares the value of WSG(i) as computed for candidate connection $C_i$ for the value of WSG as previously computed for other candidate connections. If the value of WSG(i) as computed for candidate connection $C_i$ is lower than all WSG as previously computed for other candidate connections, at step 6-11 the congestion avoidance unit 100 stores the value of WSG(i) for candidate connection $C_i$ as the best candidate connection, i.e., as $WSG_B$. Of course, on the first execution of the loop of FIG. 6, the first candidate connection $C_0$ will have its value WSG(0) stored as the best candidate connection $WSG_B$. However, as explained below, subsequent execution of the loop of FIG. 6 with respect to other candidate connections may dethrone candidate connection $C_0$.

If the comparison of step 6-10 results in candidate connection $C_i$ being denominated at least temporarily as the best candidate connection $WSG_B$, step 6-12 is further performed for candidate connection $C_i$. At step 6-11, the congestion avoidance unit 100 chooses the best path candidate (assuming that candidate connection $C_i$ is the best candidate connection $WSG_B$). For the candidate connection $C_i$, the best path candidate is the path assignment having the vector chosen at step 6-7 as having the strongest weakest link. For example, when candidate connection $C_0$ becomes (temporarily) the best candidate connection $WSG_B$, at step 6-12 the congestion avoidance unit 100 chooses the path assignment comprising links $L_{c-0}$ and $L_{0-1}$ as the best candidate path for routing the candidate connection $C_0$.

After execution of step 6-12, or after a negative decision at step 6-10 that the candidate connection $C_i$ is not the best candidate connection for routing, step 6-13 is performed. At step 6-13, congestion avoidance unit 100 checks to determine if all candidate connections $C_i$ have been processed, e.g., if the steps of the loop of FIG. 6 have been performed for all candidate connections $C_i$. If other candidate connections $C_i$ remain for evaluation, the congestion avoidance unit 100 returns to step 6-2 to commence evaluation for the next candidate connection. If all candidate connections have been evaluated, congestion avoidance unit 100 has completed its routing determinations (as indicated by step 6-14).

As indicated above, as each candidate connection $C_i$ is evaluated, at step 6-11 there is the possibility that the value of WSG(i) as computed for candidate connection $C_i$ may be the lowest value WSG(i) value thus far calculated, in which case the candidate connection $C_i$ becomes the temporary best candidate connection $WSG_B$. Thus, after all candidate connections $C_i$ have been evaluated (i.e., after all executions of the loop of FIG. 6 have been completed as determined at step 6-13), the candidate connection which had the lowest WSG(i) value is chosen as the best candidate connection $WSG_B$. Moreover, for the best candidate connection the unique path assignment determined as having the strongest one of the weakest links is used as the best candidate path (WSB) for relocating/routing that best candidate connection. As used herein, "WSB" also means the weakest link of the best candidate, and thus is indicative the best path for the best candidate connection.

The foregoing discussion has primarily explained the steps of FIG. 6 in context of the candidate connection $C_0$ in the call admission situation of FIG. 2. The performance of the steps of FIG. 6 for other candidate connections $C_1$, $C_2$, and $C_3$ of the FIG. 2 situation is understood by analogy to the preceding discussion, as well as other information supplied herein including FIG. 3B–FIG. 3C and Table 2.

As another example of a candidate connection subtraction load scenario, FIG. 3D shows the candidate connection subtraction load scenario for the situation of FIG. 2 for candidate connection $C_3$. FIG. 3D shows that, for the candidate connection subtraction load scenario developed for candidate connection $C_3$, the link $L_{c-1}$ has a 70% utilization. This is significant because, as explained below with reference to Table 2, in the connection admission situation of FIG. 2 the candidate connection $C_3$ turns out ultimately to be the best candidate connection ($WSG_B$).

In comparable manner as Table 1, Table 2 provides the corresponding information for the respective candidate connections C0, C1, $C_2$, and $C_3$ for the connection admission situation of FIG. 2. Table 2 is partitioned into sections for each of the respective candidate connections C0, C1, $C_2$, and $C_3$. Each section also provides a row which indicates the WSG value for the subtracted graph of the respective candidate connection. The second through fifth columns of Table 2 essentially provide the same type of information as provided in respective first through fourth columns of Table 1.

Table 2 is generated in time sequence, beginning with the first candidate connection $C_0$ and continuing through each of the remaining successive candidate connections $C_1$, $C_2$, and $C_3$. As described in connection with FIG. 4A–FIG. 4B, after evaluating the first candidate connection $C_0$ the congestion avoidance unit 100 tentatively concludes that its only candidate evaluated thus far (candidate connection $C_0$) is the best candidate connection, and that the path comprising links $L_{c-0}$ and $L_{0-1}$ is the best candidate path (WSB) for routing the candidate connection $C_0$. The choice path comprising links $L_{c-0}$ and $L_{0-1}$ as the best candidate path (WSB) is reflected by the notation WBC=WSG in the last column of Table 2 for candidate connection $C_0$.

TABLE 2

| $C_I$ | Path | Path Vector | Weakest Link of Path | Weakest Link of Graph |
|---|---|---|---|---|
| $C_0$ | Subtracted graph | | | WSG = 90% |
| | $L_{c-1}$ | {110%} | 110% | 110% |
| | $L_{c-0}$; $L_{0-1}$ | {30% 45%} | 45% | WBC = WSG |
| | $L_{c-2}$; $L_{1-2}$ | {45% 85%} | 85% | |
| | $L_{c-3}$; $L_{2-3}$; $L_{1-2}$ | {60% 60% 85%} | 85% | |

TABLE 2-continued

| $C_I$ | Path | Path Vector | Weakest Link of Path | Weakest Link of Graph |
|---|---|---|---|---|
| $C_1$ | Subtracted graph | | | WSG = 85% |
| | $L_{c-0}$ | {35%} | 35% | WBC = WSG |
| | $L_{c-1}$; $L_{0-1}$ | {110% 50%} | 110% | |
| | $L_{c-2}$; $L_{1-2}$; $L_{0-1}$ | {50% 90% 50%} | 90% | |
| | $L_{c-3}$; $L_{2-3}$; | {65% 65% 90%} | 90% | |
| | $L_{1-2}$; $L_{0-1}$ | 50%} | | |
| $C_2$ | Subtracted graph | | | WSG = 85% |
| | $L_{c-2}$ | {50%} | 50% | 85% |
| | $L_{c-1}$; $L_{1-2}$ | {110% 65%} | 110% | |
| | $L_{c-3}$; $L_{2-3}$ | {65% 65%} | 65% | |
| | $L_{c-0}$; $L_{0-1}$; $L_{1-2}$ | {35% 50% 65%} | 85% | |
| $C_3$ | Subtracted graph | | | WSG = 70% |
| | $L_{c-3}$ | {80%} | 80% | |
| | $L_{c-2}$; $L_{2-3}$ | {65% 40%} | 65% | WBC = WSG |
| | $L_{c-1}$; $L_{1-2}$; $L_{2-3}$ | {110% 65% 40%} | 110% | |
| | $L_{c-0}$; $L_{0-1}$; $L_{1-2}$; $L_{2-3}$ | {50% 65% 65% 40%} | 65% | 70% (=WBC) |

The choice of candidate connection $C_0$ as the best candidate connection is short lived, however. After evaluating candidate connection $C_1$, the congestion avoidance unit 100 concludes that the WSG(1) value of 85% for candidate connection $C_1$ is less (and thus better) than the previously calculated value of 90% for $WSG_B$ (the previous value being last performed for candidate connection $C_0$). Moreover, in the course of evaluating candidate connection $C_1$, the congestion avoidance unit 100 has chosen the path comprising link $L_{c-0}$ to be the best candidate path for the now-favored best candidate connection $C_1$. The choice of the path comprising link $L_{c-0}$ as the best candidate path (WSB) is reflected by the notation WBC=WSG in the last column of Table 2 for candidate connection $C_1$.

It turns out that the subsequent evaluation of candidate connection $C_2$ does not change the best candidate connection thus far ascertained by congestion avoidance unit 100. The congestion avoidance unit 100 determines that the best candidate path for candidate connection $C_2$ is the link $L_{c-2}$, but the WSG(2) value of 85% for candidate connection $C_2$ is no better than the value of WSG(1). Moreover, the best candidate path for the candidate connection $C_2$ has a weakest link value of 50%, which means that it is weaker (and hence less desirable) than the path of link $L_{c-0}$ for still-favored best candidate connection $C_1$.

Upon the last execution of the loop of FIG. 6, congestion avoidance unit 100 ultimately concludes that candidate connection $C_3$ is, in fact, the best candidate connection and that the path of link $L_{c-2}$ and link $L_{2-3}$ is the best candidate path for relocation/routing. As shown in Table 2, candidate connection $C_3$ has the best (lowest) WSG value of 70% (lower than the 85% values for WSG(1) and WSG(2)). Moreover, the path of link $L_{c-2}$ and link $L_{2-3}$ has the strongest weakest link in the portion of Table 2 concerning candidate connection $C_3$ (link $L_{c-2}$ having a 65% utilization). The choice of the path comprising link $L_{c-2}$ and link $L_{2-3}$ as the best candidate path (WSB) is reflected by the notation WBC=WSG in the last column of Table 2 for candidate connection $C_3$. The WBC notation for candidate connection $C_3$ in Table 2 is the last-in-time awarding as WBC, so that the path comprising link $L_{c-2}$ and link $L_{2-3}$ is finally declared the weakest link of the best candidate WBC.

Figure 5:
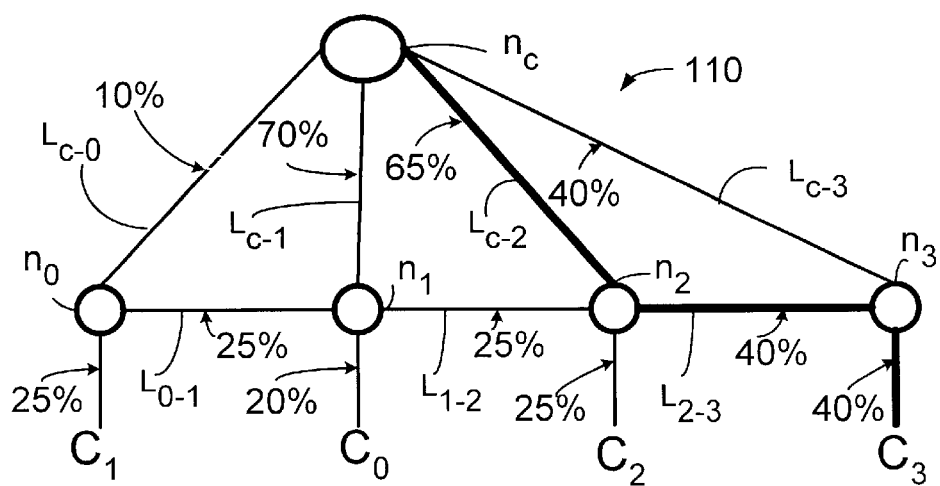
FIG. 5 is a schematic view showing a relocation/routing path for the connection admission situation of FIG. 2 as being a best path candidate which produces the best graph with the strongest weakest link.

Thus, as can be seen from Table 2 and FIG. 5, candidate connection $C_3$, with a relocation/routing path of link $L_{c-2}$ and link $L_{2-3}$, produces the best graph with the strongest weakest link. While it may be noted that, for candidate connection $C_3$, the path comprising links $L_{c\text{-}0}$; $L_{0\text{-}1}$; $L_{1\text{-}2}$; $L_{2\text{-}3}$ may be equally good, the length of the path comprising links $L_{c\text{-}0}$; $L_{0\text{-}1}$; $L_{1\text{-}2}$; $L_{2\text{-}3}$ is longer, and therefore less desirable (e.g., poorer) than the path of link $L_{c\text{-}2}$ and link $L_{2\text{-}3}$.

As understood from the foregoing, the WSG (weakest link of the subtracted graph) is determined for each candidate connection $C_i$ (e.g., at step 6-4). In accordance with the present invention, Expression 1 can then be applied to each path to determine the weakest link of the best candidate (WSB), and thus is indicative the best path for the best candidate connection.

$$WBC_{new} = \text{MIN}(WBC_{old}, WSG_{candidate}, \text{MAX}(\text{Path vector})) \quad \text{Expression 1}$$

A new WBC value is assigned only if the new value gives a stronger link (e.g., smaller utilization percentage) than the old WBC value.

As described above, congestion avoidance unit 100 performs an algorithm having the complexity denoted by Expression 2.

$$O(QN^2) \quad \text{Expression 2}$$

In Expression 2, Q is the number of candidates, N is the number of nodes and goes from 0 to N-1, and the function O is the "Ordo" function which is commonly used, e.g., in mathematics and computing to express an order of computational complexity. For example, the function O can express how effectively a sorting algorithm works. In this regard, consider sorting K unsorted numbers without any prior knowledge about the numbers. The fastest theoretical method would require K−1 comparisons on average (this is only possible in a special case where the numbers are already sorted, and the sorting begins with the smallest or largest number). An algorithm that would sort the numbers with K−1 comparisons at all occasions would therefore be $O(K)$ in complexity. The fastest known algorithms are typically $O(cK)$, where c is some constant larger than 1. An algorithm of $O(cK)$ is said to be linear. an algorithm that requires $O(c(N^P))$ comparisons is said to be exponential.

Thus, in the present case, as the number of connections and nodes grow, the number of calculations/computations performed by congestion avoidance unit 100 increases rapidly. Methods may be utilized to decrease the number of computations.

The present invention with its congestion avoidance technique thus presents a rapid way to determine which connection to relocate (when possible) in admission situations which could trigger congested links. Furthermore, the congestion avoidance technique of the present invention provides balancing of load in a network.

The congestion avoidance technique of the invention (as exemplified by the steps of FIG. 6) is relative standalone, and accordingly can be utilized in conjunction with other kinds of standalone network optimization algorithms.

The congestion avoidance technique of the present invention can be implemented in any suitable network node. As mentioned above, as examples the congestion avoidance unit 100 can be situated at a core network node or at a control node of a radio access network (such as, for example, a radio network controller (RNC) node). These example nodes at which congestion avoidance unit 100 can be located are illustrated in FIG. 7.

Figure 7:
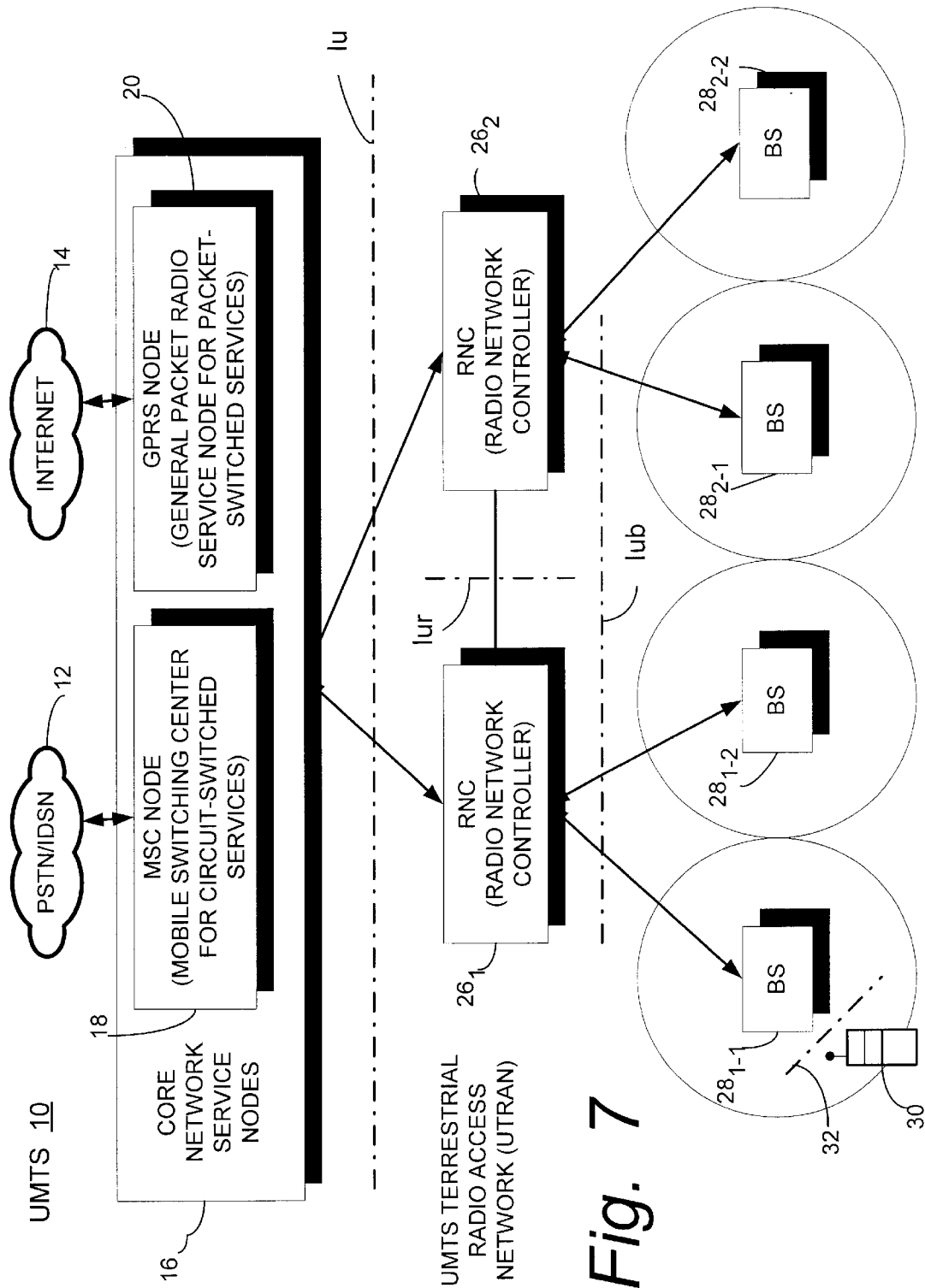
FIG. 7 is diagrammatic view of example mobile communications system in which the present invention may be advantageously employed.

FIG. 7 shows a non-limiting, example context of a universal mobile telecommunications (UMTS) 10 in which the congestion avoidance unit of the present invention can be employed. A representative, connection-oriented, external core network, shown as a cloud 12 may be for example the Public Switched Telephone Network (PSTN) and/or the Integrated Services Digital Network (ISDN). A representative, connectionless-oriented external core network shown as a cloud 14, may be for example the Internet. Both core networks are coupled to their corresponding service nodes 16. The PSTN/ISDN connection-oriented network 12 is connected to a connection-oriented service node shown as a Mobile Switching Center (MSC) node 18 that provides circuit-switched services. The Internet connectionless-oriented network 14 is connected to a General Packet Radio Service (GPRS) node 20 tailored to provide packet-switched type services which is sometimes referred to as the serving GPRS service node (SGSN). Both Mobile Switching Center (MSC) node 18 and General Packet Radio Service (GPRS) node 20 are examples of core network nodes at which the congestion avoidance unit 100 can be located.

Each of the core network service nodes 18 and 20 connects to a UMTS Terrestrial Radio Access Network (UTRAN) 24 over a radio access network (RAN) interface referred to as the Iu interface. UTRAN 24 includes one or more radio network controllers (RNCs) 26. For sake of simplicity, the UTRAN 24 of FIG. 7 is shown with only two RNC nodes, particularly RNC $26_1$ and $RNC26_2$. Each RNC 26 is connected to a plurality of base stations (BS) 28. For example, and again for sake of simplicity, two base station nodes are shown connected to each RNC 26. In this regard, RNC $26_1$ serves base station $28_{1\text{-}1}$ and base station $28_{1\text{-}2}$, while RNC $26_2$ serves base station $28_{2\text{-}1}$ and base station $28_{2\text{-}2}$. It will be appreciated that a different number of base stations can be served by each RNC, and that RNCs need not serve the same number of base stations. Moreover, FIG. 7 shows that an RNC can be connected over an Iur interface to one or more other RNCs in the URAN 24.

A user equipment unit (UE), such as user equipment unit (UE) 30 shown in FIG. 7, communicates with one or more base stations (BS) 28 over a radio or air interface 32. Each of the radio interface 32, the Iu interface, the Iub interface, and the Iur interface are shown by dash-dotted lines in FIG. 7.

Preferably, radio access is based upon wideband, Code Division Multiple Access (WCDMA) with individual radio channels allocated using CDMA spreading codes. Of course, other access methods may be employed. WCDMA provides wide bandwidth for multimedia services and other high transmission rate demands as well as robust features like diversity handoff and RAKE receivers to ensure high quality. Each user mobile station or equipment unit (UE) 30 is assigned its own scrambling code in order for a base station 28 to identify transmissions from that particular user equipment unit (UE) as well as for the user equipment unit (UE) to identify transmissions from the base station intended for that user equipment unit (UE) from all of the other transmissions and noise present in the same area.

Figure 8:
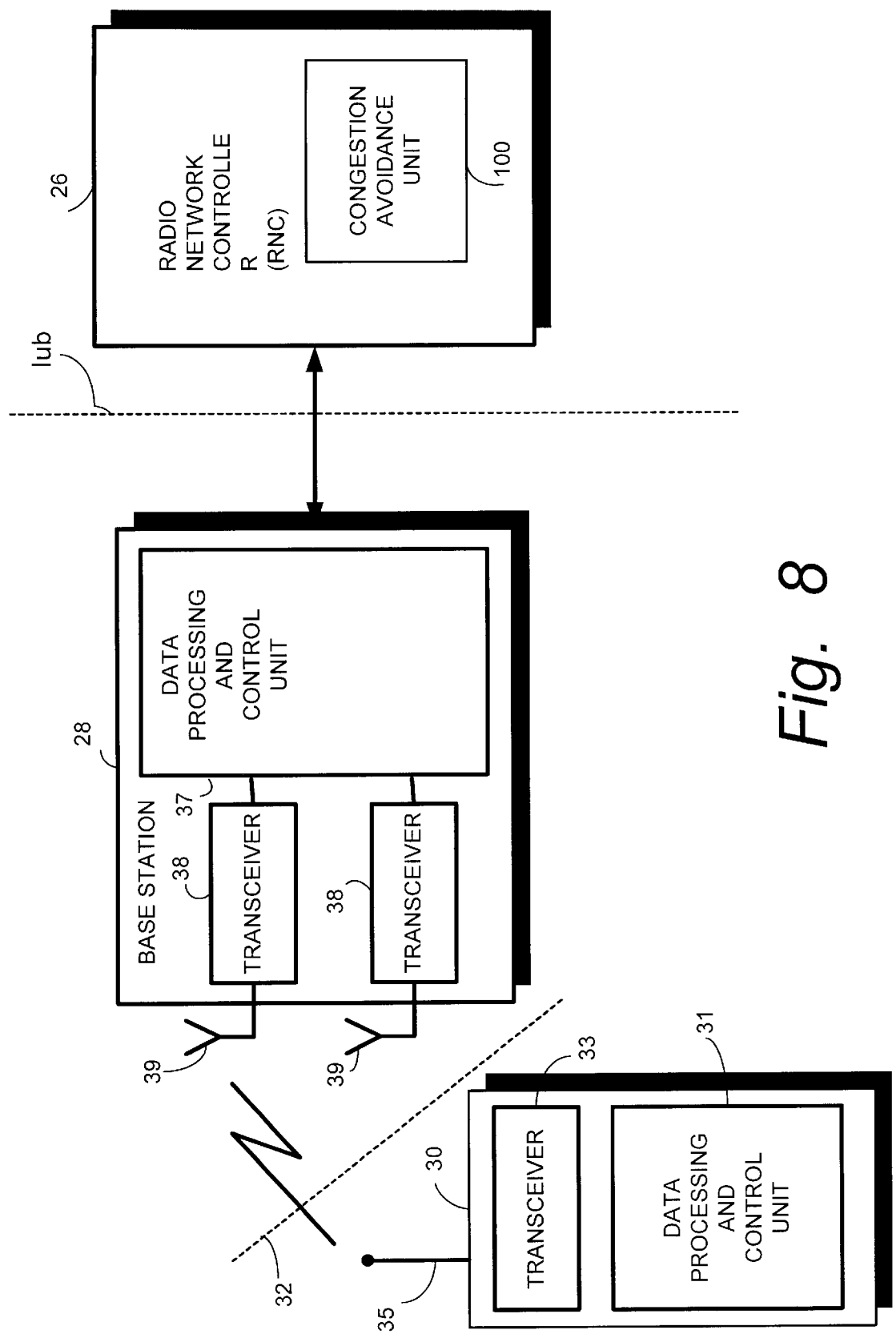
FIG. 8 is a simplified function block diagram of a portion of a UMTS Terrestrial Radio Access Network, including a user equipment unit (UE) station; a radio network controller; and a base station.

FIG. 8 shows selected general aspects of user equipment unit (UE) 30 and illustrative nodes such as radio network controller 26 and base station 28. The user equipment unit (UE) 30 shown in FIG. 8 includes a data processing and control unit 31 for controlling various operations required by the user equipment unit (UE). The UE's data processing and control unit 31 provides control signals as well as data to a radio transceiver 33 connected to an antenna 35.

The example radio network controller 26 and base station 28 as shown in FIG. 8 are radio network nodes that each include a corresponding data processing and control unit 36 and 37, respectively, for performing numerous radio and data processing operations required to conduct communications between the RNC 26 and the user equipment units (UEs) 30. Part of the equipment controlled by the base station data processing and control unit 37 includes plural radio transceivers 38 connected to one or more antennas 39.

As mentioned above, in some embodiments of the invention the congestion avoidance unit 100 can be located in a radio network controller node (RNC), such as one of the radio network controllers (RNCs) 26 shown in FIG. 7. In such case, the congestion avoidance unit 100 is included as part of the data processing and control unit 36 (as shown in FIG. 8).

Regardless of its location—whether at a core network node or at a control node of a radio access network—the congestion avoidance unit 100 must have knowledge of the topology of the network (e.g., the node and path locations), as well as the current degree of utilization of the links of the network. Such topology and utilization information is generally available to a core network node, and can be communicated by appropriate signaling to a control node of the radio access network (either when requested or on an updating basis).

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of operating a telecommunications network to alleviate congestion on a congested link, the telecommunications network having plural nodes including a common node, a plurality of connections being carried by the telecommunications network, each of the plurality of connections being carried over one of plural paths of the network, each path including at least one link, each link connecting two of the plural nodes, each of the plural paths being connected to the common node by one of the plural links, wherein the method comprises:

determining, for routing purposes, a best candidate connection from a set of candidate connections;

determining a best candidate path to carry the best candidate connection;

the best candidate connection and the best candidate path being determined so that, after routing the best candidate connection to the best candidate path, (congestion on the congested link is alleviated and) a load of the weakest link in the network is as low as possible;

developing, for each candidate connection, a network topology connection subtraction load scenario, each connection subtraction load scenario having a load for the corresponding candidate connection subtracted therefrom;

determining a weakest link of each connection subtraction load scenario, whereby for each candidate connection there is a weakest link of its connection subtraction load scenario.

2. The method of claim 1, further comprising forming the set of candidate connections with a plurality of connections which use a congested link.

3. The method of claim 1, further comprising:

(a) for a particular candidate connection, developing a set of network topology path load scenarios, each path load scenario being developed by augmenting the connection subtraction load scenario for the particular candidate connection with a unique path assignment for the particular candidate connection;

(b) determining, for each network topology path load scenario of the set, a weakest link comprising the unique path assignment;

(c) determining, from the entire set of network topology path load scenarios, a strongest one of weakest links determined in step (b) for the particular candidate connection.

4. The method of claim 3, further comprising:

(d) determining a weakest link for the for the network topology path load scenario having the strongest one of the weakest links as determined in step (c); and (e) for the particular candidate connection, using the weakest link determined at step (d) as the weakest link of its connection subtraction load scenario if the strength of the weakest link determined at step (d) exceeds the strength of the weakest link of its connection subtraction load scenario as previously determined.

5. The method of claim 4, wherein the candidate connection having a strongest weakest link of its connection subtraction load scenario is chosen as the best candidate connection, and wherein for the best candidate connection the unique path assignment determined as having the strongest one of the weakest links is used as the best candidate path.

6. The method of claim 1, wherein the plural nodes include radio network controller (RNC) nodes of a radio access network (RAN).

7. The method of claim 6, wherein the common node is a core network node.

8. The method of claim 1, wherein the steps of claim 1 are performed at the common node.

9. A telecommunications network which carries a plurality of telecommunication connections, the network comprising:

plural nodes including a common node;

plural paths, each of the plurality of connections being carried over one of plural paths, each path including at least one link, each link connecting two of the plural nodes, each of the plural paths being connected to the common node by one of the plural links;

a connection handler which alleviates congestion on a congested link by performing the operations of:

determining, for routing purposes, a best candidate connection from the plurality of connections;

determining a best candidate path to carry the best candidate connection, the best candidate connection and the best candidate path being determined so that, after routing the best candidate connection to the best candidate path, a load of the weakest link in the network is as low as possible;

developing, for each candidate connection, a network topology connection subtraction load scenario, each connection subtraction load scenario having a load for the corresponding candidate connection subtracted therefrom;

determining a weakest link of each connection subtraction load scenario, whereby for each candidate connection there is a weakest link of its connection subtraction load scenario.

10. The network of claim 9, wherein the connection handler performs the further operations of:

(a) for a particular candidate connection, developing a set of network topology path load scenarios, each path load scenario being developed by augmenting the connection subtraction load scenario for the particular candidate connection with a unique path assignment for the particular candidate connection;

(b) determining, for each network topology path load scenario of the set, a weakest link comprising the unique path assignment;

(c) determining, from the entire set of network topology path load scenarios, a strongest one of weakest links determined in step (b) for the particular candidate connection.

11. The network of claim 10, wherein the connection handler performs the further operations of:

(d) determining a weakest link for the for the network topology path load scenario having the strongest one of the weakest links as determined in step (c); and (e) for the particular candidate connection, using the weakest link determined at step (d) as the weakest link of its connection subtraction load scenario if the strength of the weakest link determined at step (d) exceeds the strength of the weakest link of its connection subtraction load scenario as previously determined.

12. The network of claim 11, wherein the connection handler performs the further operations of:

choosing as the best candidate connection the candidate connection having a strongest weakest link of its connection subtraction load scenario; and for the best candidate connection, using the unique path assignment determined as having the strongest one of the weakest links as the best candidate path.

13. The network of claim 9, wherein the plural nodes include radio network controller (RNC) nodes of a radio access network (RAN).

14. The network of claim 13, wherein the common node is a core network node.

15. The network of claim 9, wherein the connection handler is situated at the common node.

16. The network of claim 15, wherein the common node is a core network node.

* * * * *